US009805239B2

(12) United States Patent
Wang et al.

(10) Patent No.: US 9,805,239 B2
(45) Date of Patent: *Oct. 31, 2017

(54) QR CODE DETECTING DEVICE AND OPERATION METHOD THEREOF

(71) Applicant: PIXART IMAGING INC., Hsin-Chu (TW)

(72) Inventors: Guo-Zhen Wang, Hsin-Chu (TW); En-Feng Hsu, Hsin-Chu (TW)

(73) Assignee: PIXART IMAGINE INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/262,633

(22) Filed: Sep. 12, 2016

(65) Prior Publication Data

US 2017/0061185 A1 Mar. 2, 2017

Related U.S. Application Data

(63) Continuation-in-part of application No. 15/160,170, filed on May 20, 2016, now Pat. No. 9,600,700, (Continued)

(30) Foreign Application Priority Data

Aug. 31, 2015 (TW) .............................. 104128606 A

(51) Int. Cl.
 *G06K 7/14* (2006.01)
 *G06K 7/10* (2006.01)
(52) U.S. Cl.
 CPC ....... *G06K 7/1417* (2013.01); *G06K 7/10722* (2013.01); *G06K 7/1452* (2013.01)

(58) Field of Classification Search
 None
 See application file for complete search history.

(56) References Cited

U.S. PATENT DOCUMENTS

| 4,843,222 A | 6/1989 | Hochgraf |
| 9,600,700 B1 * | 3/2017 | Wang .................. G06K 7/1417 235/462.22 |

(Continued)

FOREIGN PATENT DOCUMENTS

| CN | 1114441 A | 1/1996 |
| CN | 101615259 A | 12/2009 |

(Continued)

*Primary Examiner* — Kristy A Haupt
(74) *Attorney, Agent, or Firm* — Li & Cai Intellectual Property (USA) Office

(57) ABSTRACT

Disclosed are a QR code detection device and an operation method thereof. The QR code detection device comprises a body, a barcode detector and a barcode decoder. The barcode detector captures and processes a code image outside the body, and accumulates a number of times when a predetermined pattern feature is recognized in the code image. The predetermined pattern feature is a predetermined distance ratio. The barcode detector chooses a near-distance detection rule or a far-distance detection rule according to the processed code image to determine whether the predetermined pattern feature is recognized in the QR code image. When the barcode decoder determines that the code image is a QR code image because the number of times equals to a threshold number, the barcode decoder is automatically turned on to capture and decode the QR code image outside the body.

19 Claims, 6 Drawing Sheets

Related U.S. Application Data which is a continuation-in-part of application No. 15/075,831, filed on Mar. 21, 2016.

(56) References Cited

U.S. PATENT DOCUMENTS

| | | |
|---|---|---|
| 2005/0167498 A1 | 8/2005 | Ito et al. |
| 2005/0173544 A1 | 8/2005 | Yoshida |
| 2008/0029603 A1 | 2/2008 | Harris |
| 2009/0014520 A1 | 1/2009 | Kofman et al. |
| 2009/0212113 A1 | 8/2009 | Chiu et al. |
| 2015/0262051 A1 | 9/2015 | Yoshida |
| 2016/0132707 A1 | 5/2016 | Lindbo et al. |

FOREIGN PATENT DOCUMENTS

| | | |
|---|---|---|
| CN | 202976114 U | 6/2013 |
| TW | 201201107 A1 | 1/2012 |
| TW | 201441945 A | 11/2014 |

* cited by examiner

QR CODE DETECTING DEVICE AND OPERATION METHOD THEREOF

CROSS-REFERENCE TO RELATED APPLICATIONS

This application is a continuation-in-part of application Ser. No. 15/160,170, filed May 20, 2016 which is also a continuation-in-part of application Ser. No. 15/075,831, filed Mar. 21, 2016, and the entire contents of which are hereby incorporated herein.

BACKGROUND OF THE INVENTION

1. Field of the Invention

The instant disclosure relates to a QR code detection device and an operation method thereof; in particular, to a QR code detection device and an operation method thereof that can effectively detect a QR code even when a QR code image has a low resolution or the detection device is far from a QR code image to be detected.

2. Description of Related Art

The traditional QR code detection technologies are only for high-resolution images. Thus, when detecting the QR code, the traditional QR code detection device consumes lots of power. Although, it is known that detecting a low-resolution image consumes less power, in practice, the traditional QR code detection device has difficulty to reading a low-resolution image. Moreover, if the traditional QR code detection device is far from an image to be detected, it will be hard to detect the image.

SUMMARY OF THE INVENTION

To provide an effective QR code detection to a user even when a QR code image has a low resolution or the distance between a detection device and a QR code image is far, the instant disclosure provides a QR code detection and an operation method thereof.

In the instant disclosure, the QR code detection device comprises a body, a barcode detector and a barcode decoder. The barcode detector and the barcode decoder are built in the body. The barcode detector captures and processes a code image outside the body. In addition, the barcode detector counts a number of times when a predetermined pattern feature is recognized in the code image, wherein the predetermined pattern feature is a predetermined distance ratio. The barcode decoder is connected to the barcode detector. The barcode detector chooses a near-distance detection rule or a far-distance detection rule according to the processed code image to determine whether the predetermined pattern feature is recognized in the code image. When the barcode decoder determines that the code image is a QR code image because the number of times equals to a threshold number, the barcode decoder is automatically turned on to capture and decode the QR code image outside the body.

In one embodiment of the instant disclosure, the image processing module further comprises a noise filter module. The noise filter module is connected between the second operation module and the determination module, and executes a noise filtering mechanism to make the barcode decoder stop being wrongly turned on.

In the instant disclosure, the operation method can be adapted to a QR code detection device. The QR code detection device comprises a body, a barcode detector and a barcode decoder, and the barcode detector and barcode decoder are inbuilt in the body. The operation method comprises: capturing a code image outside the body by the barcode detector and processing the code image; counting a number of times when a predetermined pattern feature is recognized in the code image by the barcode detector, wherein the predetermined pattern feature is a predetermined distance ratio; determining that the code image is a QR code image when the number of times equals to a threshold number, and then and automatically turning on the barcode decoder to capture and decode the QR code image outside the body. Moreover, the barcode detector chooses a near-distance detection rule or a far-distance detection rule according to the processed QR code image to determine whether the predetermined pattern feature is recognized in the code image.

In one embodiment of the instant disclosure, during the time when the QR code image outside the body is processing by the barcode detector, a noise filtering mechanism is executed to make the barcode decoder stop being wrongly turned on.

To sum up, by choosing a near-distance detection rule or a far-distance detection rule to determine whether a predetermined pattern feature is recognized in a code image, the QR code detection device and the operation method thereof provided by the instant disclosure can be used even when a code image has a low resolution or the distance between a detection device and a code image is far. Moreover, by executing a noise filtering mechanism, it can prevent the barcode decoder of the QR code detection device from wrongly turning on, which can really improve the detection accuracy.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, but these elements should not be limited by these terms. These terms are only used to distinguish one element from another. For example, a first element could be termed a second element, and, similarly, a second element could be termed a first element, without departing from the teachings of the instant disclosure. As used herein, the term "and/or" includes any and all combinations of one or more of the associated listed items.

Figure 1:
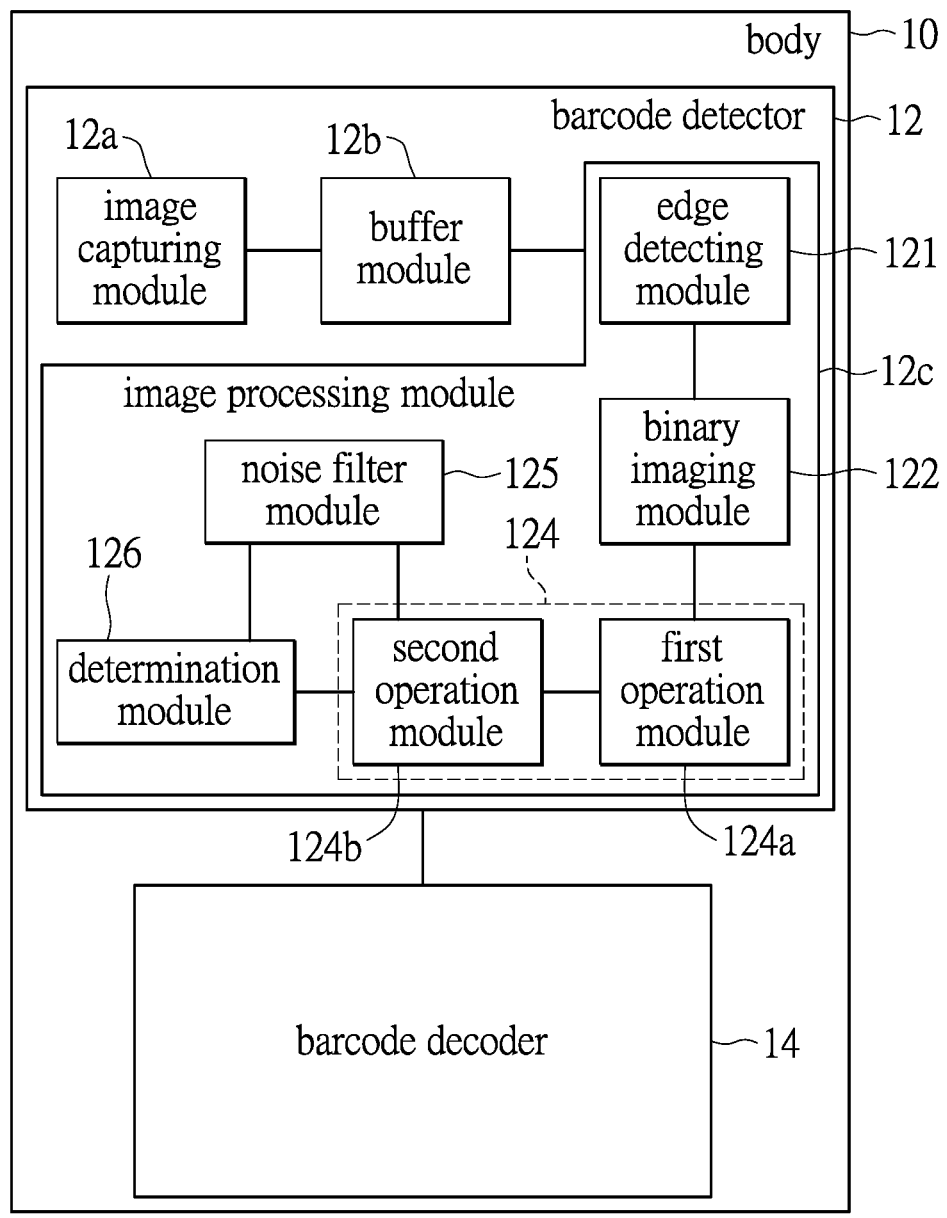
FIG. 1 shows a block diagram of a QR code detection device of one embodiment of the instant disclosure.

One Embodiment of the QR Code Detection Device an image operation module, connected to the binary imaging module, choosing the near-distance detection rule or the far-distance detection rule according to the binary barcode image to determine whether the predetermined pattern feature is recognized in the code image Referring to FIG. 1, FIG. 1 shows a block diagram of a QR code detection device of one embodiment of the instant disclosure. The QR code detection device 1 comprises a body 10, a barcode detector 12 and a barcode decoder 14. The barcode detector 12 and the barcode decoder 14 are built in the body 10. In addition, the QR code detection device 1 can be a smart phone, a tablet or other kinds of portable electronic devices.

As shown in FIG. 1, the barcode decoder 14 is connected to the barcode detector 12. The barcode detector 12 comprises an image capturing module 12a, a buffer module 12b and an image processing module 12c. The buffer module 12b is connected between the image capturing module 12a and the image processing module 12c. Additionally, the image processing module 12 comprises an edge detecting module 121, a binary imaging module 122, an image operation module 124, a noise filter module 125 and a determination module 126, wherein the image operation module 124 comprises a first operation module 124a and a second operation module 124b. In the image processing module 12, the binary imaging module 122 is connected to the edge detecting module 121, the binary imaging module 122 is connected to the first operation module 124a, and the first operation module 124a is connected to the second operation module 124b. The determination module 126 is connected to the second operation module 124b, and the second operation module 124b and the determination module 126 are both connected to the noise filter module 125.

It is worth mentioning that, the image capturing module 12a of the barcode detector 12 can be a low-level image sensor used as an auxiliary camera of the QR code detection device 1 such that the QR code detection device 1 can continually capture images even when working in a resting mode. Comparing with the image capturing module 12a of the barcode detector 12, the barcode decoder 14 can have a high-level image sensor used as a master camera of the QR code detection device 1, which has a high resolution to capture a QR code image for the further decoding.

In this embodiment, the barcode detector 12 captures a code image outside the body 10 by the image capturing module 12a, and sequentially and temporarily stores the pixel data of the code image, row by row, in the buffer module 12b. The buffer module 12b comprises at least one line buffer. After that, the image processing module 12 sequentially processes the data of each row of pixels of the QR code image, and details about the pixel data processing are illustrated in the following description.

After receiving the data of each row of pixels of the QR code image, the edge detecting module 121 executes an edge detection for the data of each row of pixels of the code image to generate a gray-scale code image. After that, the binary imaging module 122 processes the gray-scale code image to generate a binary code image. The binary code image is generated by converting the gray-scale levels of pixels that are larger than a critical gray-scale level to be a maximum gray-scale level and defining the gray-scale levels of pixels that are smaller than the critical gray-scale level to be a minimum gray-scale level. Then, the first operation module 124a generates a fever chart according to the pixel coordinate and the gray-scale level of a row/column of pixels in the binary code image. In addition, the first operation module 124a calculates distances between the pixels having the maximum gray-scale level to determine whether the minimum distance among the calculated distances is shorter than a predetermined minimum distance, and accordingly generates a determination result.

According to this determination result, the second operation module 124b chooses a near-distance detection rule or a far-distance detection rule to determine whether a determined pattern feature is recognized in the code image, and the relevant details are illustrated in the following description.

Figure 2:
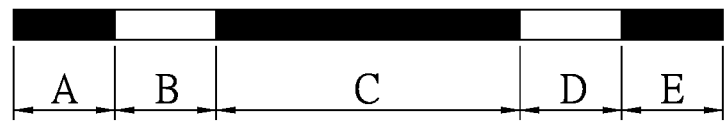
FIG. 2 shows the calculated distances between adjacent pixels of which the gray-scale levels are both the maximum gray-scale level.

It should be noted that, the unit of the distances between the pixels having the maximum gray-scale level is the number of pixels. In other words, the distances between the pixels having the maximum gray-scale level refers to how many pixels having the minimum gray-scale level are between one pixel having the maximum gray-scale level and the next pixel having the maximum gray-scale level. Referring to FIG. 2, FIG. 2 shows the calculated distances between adjacent pixels of which the gray-scale levels are both the maximum gray-scale level. Basically, FIG. 2 shows an image of one row of pixels of the binary code image. As shown in FIG. 2, the distance between the first pixel having the maximum gray-scale level and the second pixel having the maximum gray-scale level is A, the distance between the second pixel having the maximum gray-scale level and the third pixel having the maximum gray-scale level is B, the distance between the third pixel having the maximum gray-scale level and the fourth pixel having the maximum gray-scale level is C, the distance between the fourth pixel having the maximum gray-scale level and the fifth pixel having the maximum gray-scale level is D, and the distance between the fifth pixel having the maximum gray-scale level and the sixth pixel having the maximum gray-scale level is E.

Logically, when a detection device is near a code image, it captures the code image and obtains a larger image. For example, the distance between the detection device and the code image can be 10 cm. Thus, the distances A~E between the pixels having the maximum gray-scale level are also larger. For example, A is 7, B is 8, C is 20, D is 7 and E is 6. On the other hand, when a detection device cannot be that close to a code image, it captures the code image and obtains a smaller image. For example, the distance between the detection device and the code image can be 40 cm. Thus, the distances A~E between the pixels having the maximum gray-scale level are also smaller. For example, A is 2, B is 3, C is 5, D is 1 and E is 2.

Assuming that a predetermined minimum distance in this embodiment is 4, in the above mentioned example of the QR code detecting device 1 detecting a QR code image and the distance between the QR code detecting device 1 and the QR code image being 10 cm, according to the determination result, the second operation module 124b can learn that the minimum distance among the calculated distances is larger than the predetermined minimum distance (that is, E=6>4). The second operation module 124b thus determines that the distance between the QR code detecting device 1 and the detected QR code image is short, and as a result the second operation module 124b chooses a near-distance detection rule to determine whether the predetermined pattern feature is recognized in the code image. At the same time, the second operation module 124b counts a number of times when the predetermined pattern feature is recognized in the code image. On the other hand, in the above mentioned example of the QR code detecting device 1 detecting a QR code image and the distance between the QR code detecting device 1 and the QR code image being 40 cm, according to the determination result, the second operation module 124b can learn that the minimum distance among the calculated distances is less than the predetermined minimum distance (that is, D=1<4). The second operation module 124b thus determines that the distance between the QR code detecting device 1 and the detected QR code image is far, and as a result the second operation module 124b chooses a far-distance detection rule to determine whether the predetermined pattern feature is recognized in the code image. At the same time, the second operation module 124b counts a number of times when the predetermined pattern feature is recognized in the code image.

Generally, different types of barcode image have different pattern features. For the QR code image, its pattern feature is a predetermined distance ratio, which is 1:1:3:1:1.

The following descriptions are for further illustrating the near-distance detection rule and the far-distance detection rule. The near-distance detection rule and the far-distance detection rule are both used for determining whether the distances between the pixels having the maximum gray-scale level has the predetermined distance ratio, which is 1:1:3:1:1. In this embodiment, according to the near-distance detection rule, if the distances A~E between the pixels having the maximum gray-scale level satisfy the Equations 1~4 as follows, it can be determined that the distances A~E between the pixels having the maximum gray-scale level have the predetermined distance ratio, which is 1:1:3:1:1.

$$|B-A| \leq QR\_Ratio\_1 * A \quad \text{(Equation 1)}$$

$$|C-3*A| \leq QR\_Ratio\_2 * A \quad \text{(Equation 2)}$$

$$|D-A| \leq QR\_Ratio\_1 * A \quad \text{(Equation 3)}$$

$$|E-A| \leq QR\_Ratio\_1 * A \quad \text{(Equation 4)}$$

In addition, according to the far-distance detection rule, if the distances A~E between the pixels having the maximum gray-scale level satisfy the Equations 1'~4' as follows, it can be determined that the distances A~E between the pixels having the maximum gray-scale level have the predetermined distance ratio, which is 1:1:3:1:1.

$$|B-A| \leq 1 \quad \text{(Equation 1')}$$

$$|C-3*A|QR\_Ratio\_2 * A \quad \text{(Equation 2')}$$

$$|D-A| \leq 1 \quad \text{(Equation 3')}$$

$$|E-A| \leq 1 \quad \text{(Equation 4')}$$

The Equations 1~4 and the Equations 1'~4' show that the difference of the distance A and the distance B, the difference of the distance A and the distance D, the difference of the distance A and the distance E, and the difference of the distance E and three times of the distance A need to be equal to or less than a numerical range. For example, this numerical range can be 1 or the distance A times a certain ratio (e.g., QR_Ratio_1 or QR_Ratio_2). In addition, in the Equations 1~4 and the Equations 1'~4', QR_Ratio_1 and QR_Ratio_2 are predetermined ratios, and in this embodiment, QR_Ratio_1 is predetermined to be 0.25 and the QR_Ratio_2 is predetermined to be 0.75.

For the above mentioned example that the QR code detecting device 1 is detecting a QR code image and the distance between the QR code detecting device 1 and the QR code image is 10 cm, if the distances A=7, B=8, C=20, D=7 and E=6 are inputted to the Equations 1~4, it can be obtained that:

$$|8-7| \leq 0.25 * 4$$

$$|20-3*7| \leq 0.75 * 4$$

$$|7-7| \leq 0.25 * 4$$

$$|6-7| \leq 0.25 * 4$$

It is shown that, the distances A~E have the predetermined distance ratio, which is 1:1:3:1:1. In other words, one predetermined pattern feature is recognized in the code image.

On the other hand, for the above mentioned example of the QR code detecting device 1 detecting a QR code image and the distance between the QR code detecting device 1 and the QR code image being 40 cm, if the distances A=2, B=3, C=5, D=1 and E=2 are inputted to the Equations 1'~4', it can be obtained that:

$$|3-2| \leq 1$$

$$|5-3*2| \leq 0.75 * 2$$

$$|1-2| \leq 1$$

$$|2-1| \leq 1$$

It is shown that, the distances A~E have the predetermined distance ratio, which is 1:1:3:1:1. In other words, one predetermined pattern feature is recognized in the code image.

It is worth mentioning that, in the above mentioned example of the QR code detecting device 1 detecting a QR code image and the distance between the QR code detecting device 1 and the QR code image being 40 cm, if the second operation module 124b chooses the near-distance detection rule to determine whether the distances A~E between the pixels having the maximum gray-scale level have the predetermined distance ratio, which is 1:1:3:1:1, it will show that the ratio of the distances A~E is not 1:1:3:1:1, even though the ratio of the distances A~E is actually 1:1:3:1:1. Thus, in this example, to prevent this kind of incorrect determination, the second operation module 124b needs to choose the far-distance detection rule according to a determination result generated by the first operation module 124a to determine whether the ratio of the distances between the pixels having the maximum gray-scale level is 1:1:3:1:1.

According to the above description, each time after the image processing module 12c processes the data of one row of pixels of the code image, the second operation module 124b then counts a number of times when a predetermined pattern feature is recognized in the code image. However, the second operation module 124b may incorrectly count the number of times when the predetermined pattern feature is recognized in the code image due to factors, such as low resolution, random noises or insufficient background light. Thus, in this embodiment, the noise filter module 125 executes a noise filtering mechanism to prevent the second operation module 124b from incorrectly counting the number of times when the predetermined pattern feature is recognized in the code image, and further prevents the barcode decoder 14 from wrongly turning on and prevents an invalid QR code detection made by the barcode decoder 14. The relevant details about how the noise filter module 125 executes the noise filtering mechanism are illustrated in the following description.

Figure 3A:
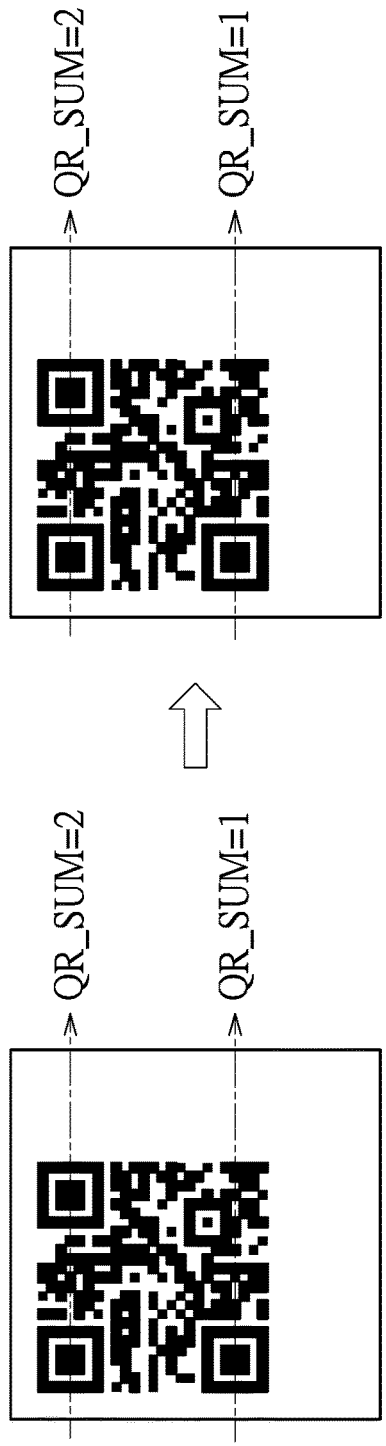
FIG. 3A and FIG. 3B are schematic diagrams showing a noise filtering mechanism of one embodiment of the instant disclosure.
Figure 3B:
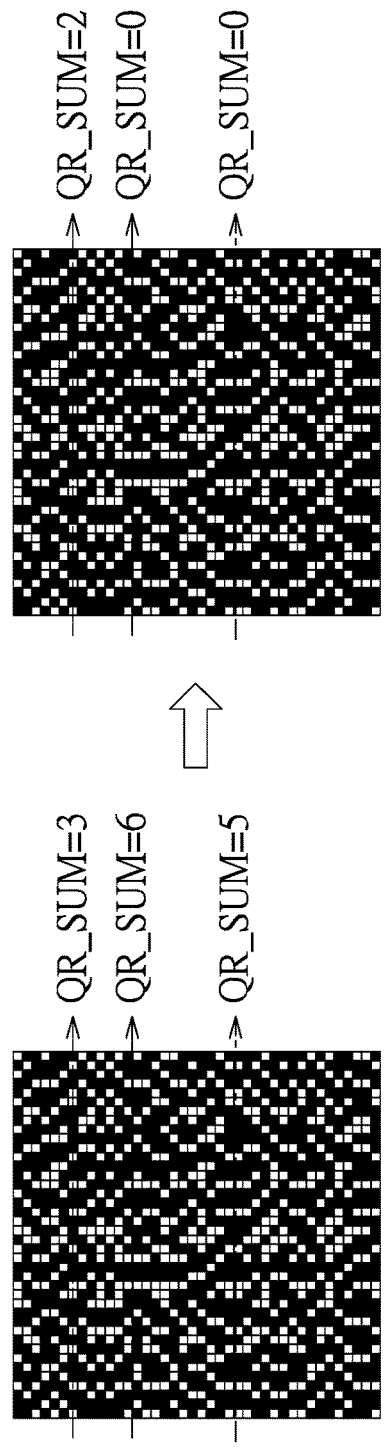

Referring to FIG. 3A and FIG. 3B, FIG. 3A and FIG. 3B are schematic diagrams showing a noise filtering mechanism of one embodiment of the instant disclosure. In this embodiment, each time after the second operation module 124b counts the number of times when a predetermined pattern feature is recognized in the code image, the noise filter module 125 executes a noise filtering mechanism to determine whether the number of times counted by the second operation module 124b is larger than a threshold number. For ease of illustration, this threshold number is determined as 4 in this embodiment.

If the number of times counted by the second operation module 124b is not only less than 4 but less than or just equal to 2 (as shown in FIG. 3A, the second operation module 124b counts the number of times when the predetermined pattern feature is recognized in the code image, and one time obtains a number of times QR_SUM=2 and another time obtains a number of times QR_SUM=1), the noise filter module 125 determines to keep the number of times counted by the second operation module 124b (as shown in FIG. 3A, still, these two numbers of times stay as QR_SUM=2 and QR_SUM=1).

If the number of times counted by the second operation module 124b is greater than 4 (as shown in FIG. 3B, the second operation module 124b counts the number of times when the predetermined pattern feature is recognized in the code image, and one time obtains a number of times QR_SUM=6 and another time obtains a number of times QR_SUM=5), the noise filter module 125 determines to reset the number of times to zero (as shown in FIG. 3B, now, these two numbers of times are QR_SUM=0 and QR_SUM=0). Moreover, if the number of times counted by the second operation module 124b is less than 4 but greater than 2 (as shown in FIG. 3B, the second operation module 124b counts the number of times when the predetermined pattern feature is recognized in the code image, and obtains a number of times QR_SUM=3), the noise filter module 125 determines to correct the number of times to 2 (again as shown in FIG. 3B, now, this number of times is QR_SUM=2). In this manner, the noise filter module 125 can correct the number of times counted by the second operation module 124b, which may be incorrect due to the random noise, and thus it prevents the barcode decoder 14 from wrongly turning on.

Figure 4:
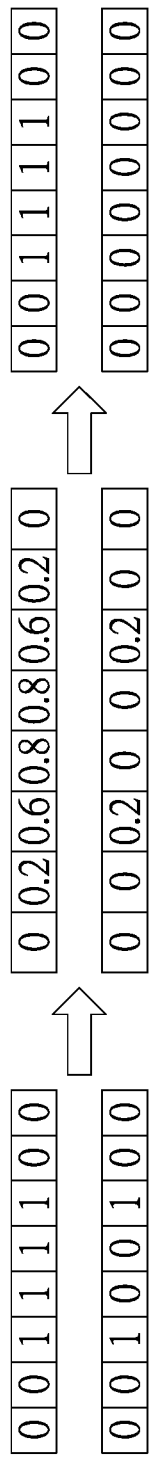
FIG. 4 is another schematic diagram showing a noise filtering mechanism of one embodiment of the instant disclosure.

Referring to FIG. 4, FIG. 4 is another schematic diagram showing a noise filtering mechanism of one embodiment of the instant disclosure. Each time after the second operation module 124b counts the number of times when the predetermined pattern feature is recognized in the code image, the noise filter module 125 executes a noise filtering mechanism to correspondingly calculate a value by inputting the number of times to a noise filter function. For example, the noise filter function can be the following.

$$y'(1)=y(1)$$

$$y'(2)=[y(1)+y(2)+y(3)]/3$$

$$y'(3)=[y(1)+y(2)+y(3)+y(4)+y(5)]/5$$

$$y'(4)=[y(2)+y(3)+y(4)+y(5)+y(6)]/5$$

$$\ldots$$

$$y'(n-1)=[y(n-2)+y(n-1)+y(n)]/3$$

$$y'(n)=y(n) \qquad \text{(Noise Filter Function)}$$

y(n) is a number of times originally counted by the second operation module 124b when the image shown by the $n^{th}$ row of pixels of the binary code image has a predetermined pattern feature (that is, the predetermined distance ratio "1:1:3:1:1"), wherein n is a positive integer. y'(n) is an output value generated by inputting y(n) to the above noise filter function. For example, as shown in FIG. 4, if for one binary code image, y(1)~y(8) are 0, 0, 1, 1, 1, 1, 0, and 0, and for another one binary code image, y(1)~y(8) are 0, 0, 1, 0, 0, 1, 0, and 0, by respectively inputting (0, 0, 1, 1, 1, 1, 0, 0) and (0, 0, 1, 0, 0, 1, 0, 0) to the noise filter function, two groups of output values y'(1)~y'(8) will be obtained, which are (0, 0.2, 0.6, 0.8, 0.8, 0.6, 0.2, 0) and (0, 0, 0.2, 0, 0, 0.2, 0, 0).

After that, the noise filter module 125 compares each of the output values in these two groups with a filtering threshold. For ease of illustration, the filtering threshold is, for example, 0.5. Specifically speaking, if the noise filter module 125 determines that the output value is greater than 0.5, then the noise filter module 125 corrects the corresponding number of times to 1. On the other hand, if the noise filter module 125 determines that the output value is equal to or less than 0.5, then the noise filter module 125 resets the corresponding number of times to zero. Back to the above example, for the output values y'(1)~y'(8) which are (0, 0.2, 0.6, 0.8, 0.8, 0.6, 0.2, 0), the noise filter module 125 corrects or resets their corresponding numbers of times to (0, 0, 1, 1, 1, 1, 0, 0), and for the output values y'(1)~y'(8) which are (0, 0, 0.2, 0, 0, 0.2, 0, 0), the noise filter module 125 corrects or resets their corresponding numbers of times to (0, 0, 0, 0, 0, 0, 0, 0). In this manner, the noise filter module 125 can also correct the number of times counted by the second operation module 124b, which may be incorrect due to the random noise, and thus it prevents the barcode decoder 14 from wrongly turning on.

Figure 5:
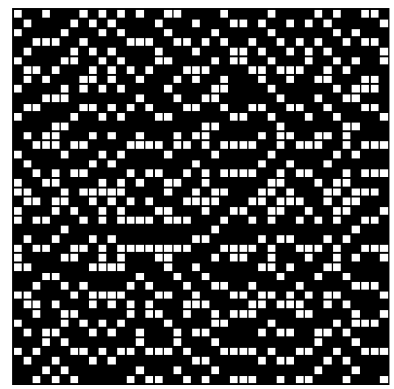
FIG. 5 is still another schematic diagram showing a noise filtering mechanism of one embodiment of the instant disclosure.

Referring to FIG. 5, FIG. 5 is still another schematic diagram showing a noise filtering mechanism of one embodiment of the instant disclosure. Commonly, when the background light is insufficient, the QR code detection device will automatically raise the gain of its barcode detector. However, under the circumstances that the background light is poor, there is no need to do the QR code detection (for example, the barcode detector is covered by an article but the user does not notice), because even the gain of the barcode detector 12 is raised to highest level, the image captured by the barcode detector may be very blurred, as shown in FIG. 5, which cannot be effectively detected. Thus, in this embodiment, the noise filtering mechanism executed by the noise filter module 125 periodically or continually detects the gain of the barcode detector 12. Once the gain of the barcode detector 12 is larger than a threshold gain, the noise filter module 125 sends an interrupting signal to make the barcode detector 12 stop working. In this manner, when the background light is poor, the barcode decoder 14 will not be turned on to do an invalid code detection.

Figure 6:
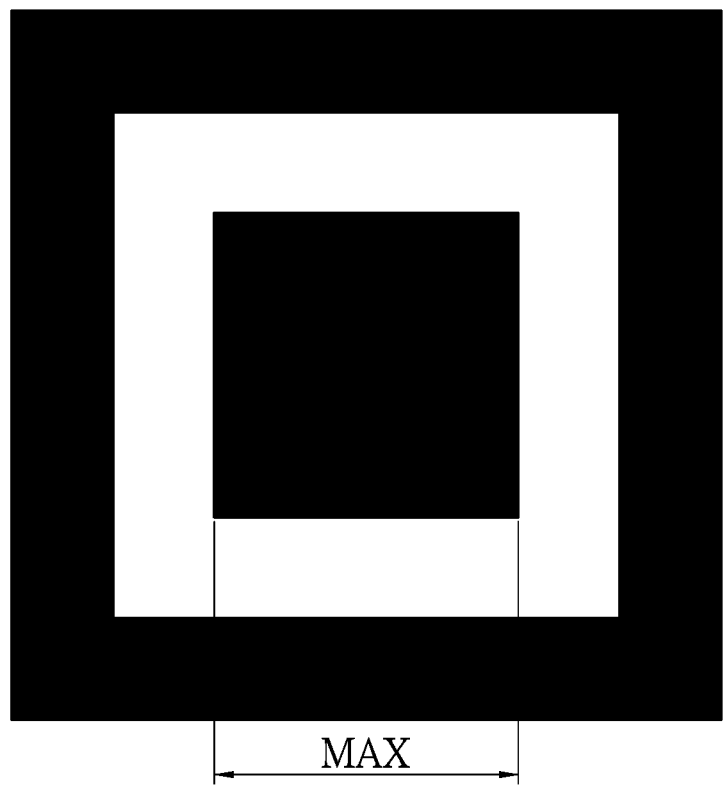
FIG. 6 is still another schematic diagram showing a noise filtering mechanism of one embodiment of the instant disclosure.

Finally, referring to FIG. 6, FIG. 6 is still another schematic diagram showing a noise filtering mechanism of one embodiment of the instant disclosure. As known, the minimum size of the QR code image that can be read by different types of QR code detection devices is different. Likewise, there is a minimum size of the QR code image for the barcode detector 12 to detect. Thus, in this embodiment, each time after the second operation module 124b counts the number of times when a predetermined pattern feature is recognized in the code image, the noise filter module 125 executes a noise filtering mechanism to determine whether the maximum distance MAX, as shown in FIG. 6, among the calculated distances between the pixels having the maximum gray-scale level is less than a predetermined maximum distance, such as the length of 6 pixels.

Specifically speaking, if the noise filter module 125 determines that the maximum distance MAX among the calculated distances between the pixels having the maximum gray-scale level is less than the predetermined maximum distance, it indicates that this image cannot be read by the QR code detection device 1. Therefore, the noise filter module 125 sends an interrupting signal to make the barcode detector 12 stop working.

It is worth mentioning that, the noise filtering mechanisms illustrated above can be used independently or be used together to effectively prevent the barcode decoder 14 from wrongly turning on.

Finally, after each time the second operation module 124b counts the number of times when a predetermined pattern feature is recognized in the code image, and after the noise filter module 125 executes a noise filtering mechanism if necessary, the barcode detector 12 accumulates the numbers of times. When the barcode detector 12 determines that a total number of times equals to a threshold number, the barcode detector 12 determines that the code image is a QR code image. As a result, the barcode decoder 14 is automatically turned on to capture and decode the QR code image outside the body 10.

One Embodiment of the Operation Method

Figure 7:
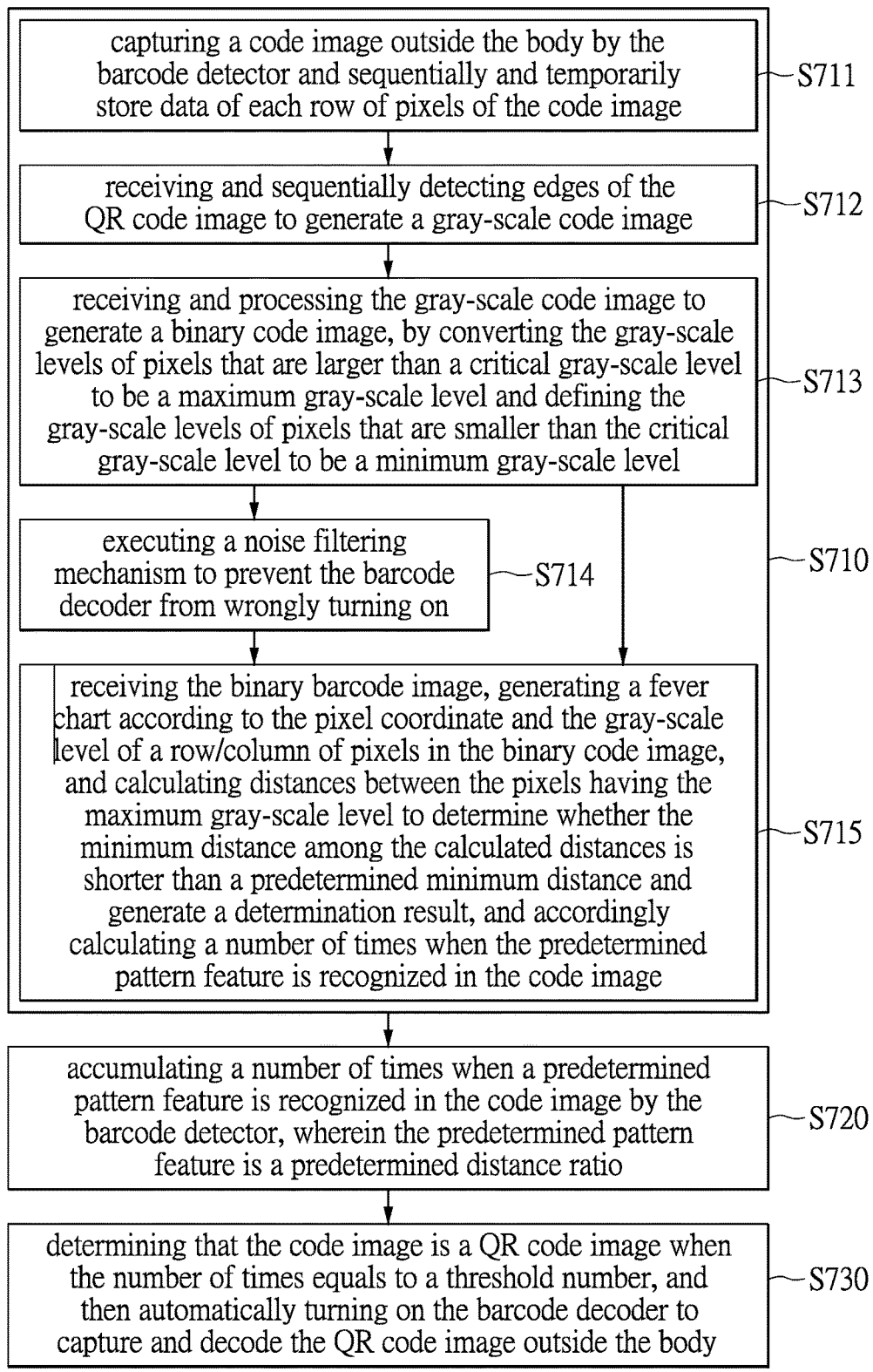
FIG. 7 shows a flow chart of an operation method adapted to a QR code detection device of one embodiment of the instant disclosure.

Referring to FIG. 7, FIG. 7 shows a flow chart of an operation method adapted to a QR code detection device of one embodiment of the instant disclosure. Also referring to FIG. 1, the operation method 700 provided in this embodiment can be adapted to the QR code detection device 1 shown in FIG. 1.

As shown in FIG. 7, the operation method 700 mainly comprises steps as follow: step S710 is capturing a code image outside the body by the barcode detector and processing the code image by the barcode detector; step S720 is accumulating a number of times when a predetermined pattern feature is recognized in the code image by the barcode detector, wherein the predetermined pattern feature is a predetermined distance ratio; and step S730 is determining that the code image is a QR code image when the number of times equals to a threshold number, and then automatically turning on the barcode decoder to capture and decode the QR code image outside the body. It is worth mentioning that, in step S710, the barcode detector chooses a near-distance detection rule or a far-distance detection rule to determine whether a predetermined pattern feature is recognized in the captured code image.

In order to choose the near-distance detection rule or the far-distance detection rule to determine whether the captured QR code image has the predetermined pattern feature, step S710 further comprises the following steps: step S711 is capturing the code image outside the body, and sequentially and temporarily store data of each row of pixels of the code image; step S712 is receiving and sequentially detecting edges of the code image to generate a gray-scale code image; step S713 is receiving and processing the gray-scale code image to generate a binary code image, by converting the gray-scale levels of pixels that are larger than a critical gray-scale level to be a maximum gray-scale level and defining the gray-scale levels of pixels that are smaller than the critical gray-scale level to be a minimum gray-scale level; and step S715 is receiving the binary barcode image, generating a fever chart according to the pixel coordinate and the gray-scale level of a row/column of pixels in the binary code image, and calculating distances between the pixels having the maximum gray-scale level to determine whether the minimum distance among the calculated distances is shorter than a predetermined minimum distance and to generate a determination result, and accordingly calculating a number of times when the predetermined pattern feature is recognized in the code image.

Specifically speaking, in step S715, if the determination result indicates that the minimum distance among the calculated distances is shorter than a predetermined minimum distance, then the far-distance detection rule is chosen for determining whether the predetermined pattern feature is recognized in the code image (in other words, for determining whether the ratio of the calculated distances is equal to the predetermined distance ratio, which is 1:1:3:1:1). Relevant details about the near-distance detection rule and the far-distance detection rule have been described in the above embodiment.

Moreover, in order to prevent the incorrect counting for the number of times when the predetermined pattern feature is recognized in the code image due to factors, such as low resolution, random noises or insufficient background light, in this embodiment, there is a step S714 between step S713 and step S715. In step S714, a noise filtering mechanism is executed to further prevent the barcode decoder from wrongly turning on and so prevents an invalid QR code detection made by the barcode decoder. Relevant details about the noise filtering mechanism have been described in the above embodiment.

To sum up, in the QR code detection device and the operation thereof provided by the instant disclosure, the barcode detector can continually capture a code image even when the QR code detection is in resting mode. In addition, the barcode detector can automatically determine whether the captured image has a predetermined pattern feature and how many times the predetermined pattern feature is recognized in this captured image, and further turn on the barcode decoder for again capturing the code image and decoding it. Moreover, the QR code detection device and the operation thereof provided by the instant disclosure at least has the following advantages.

The barcode detector of the QR code detection device chooses a near-distance detection rule or a far-distance detection rule to recognize a predetermined pattern feature in the captured image. In this manner, even when a code image has a low resolution or the distance between a detection device and the code image is far, the QR code detection device and the operation thereof provided by the instant disclosure can do a valid QR code detection.

Additionally, by using one noise filtering mechanism independently or using many noise filtering mechanisms together, in the QR code detection device and the operation thereof provided by the instant disclosure, the barcode decoder of the QR code detection device will not be wrongly turned on, which increases the detection accuracy.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A QR code detection device, comprising:
    a body;
    a barcode detector, built in the body, capturing and processing a code image outside the body, and accumulating a number of times when a predetermined pattern feature is recognized in the code image, wherein the predetermined pattern feature is a predetermined distance ratio; and
    a barcode decoder, built in the body and connected to the barcode detector;
    wherein the barcode detector chooses a near-distance detection rule or a far-distance detection rule according to the processed code image to determine whether the predetermined pattern feature is recognized in the code image, and when the barcode decoder determines that the code image is a QR code image because the number of times equals to a threshold number, the barcode decoder is automatically turned on to capture and decode the QR code image outside the body.

2. The QR code detection device according to claim 1, wherein the barcode detector comprises:
    an image capturing module, capturing the code image outside the body; and
    an image processing module, connected to the image capturing module, comprising:
        an edge detecting module, receiving and sequentially detecting edges of the code image to generate a gray-scale code image;
        a binary imaging module, connected to the edge detecting module, receiving and processing the gray-scale code image to generate a binary code image, by converting the gray-scale levels of pixels that are larger than a critical gray-scale level to be a maximum gray-scale level and defining the gray-scale levels of pixels that are smaller than the critical gray-scale level to be a minimum gray-scale level;
        an image operation module, connected to the binary imaging module, choosing the near-distance detection rule or the far-distance detection rule according to the binary barcode image to determine whether the predetermined pattern feature is recognized in the code image.

3. The QR code detection device according to claim 2, wherein the image processing module further comprises:
    a first operation module, connected to the binary imaging module, receiving the binary barcode image, generating a fever chart according to the pixel coordinate and the gray-scale level of a row/column of pixels in the binary code image, and calculating distances between the pixels having the maximum gray-scale level to determine whether the minimum distance among the calculated distances is shorter than a predetermined minimum distance and to generate a determination result; and
    a second operation module, connected to the first operation module, wherein if the determination result indicates that the minimum distance among the calculated distances is longer than or equal to the predetermined minimum distance, the second operation module chooses the near-distance detection rule to determine whether the predetermined pattern feature is recognized in the code image, but if the determination result indicates that the minimum distance among the calculated distances is shorter than the predetermined minimum distance, the second operation module chooses the far-distance detection rule to determine whether the predetermined pattern feature is recognized in the code image.

4. The QR code detection device according to claim 3, wherein the image processing module further comprises:
    a determination module, connected to the second operation module, wherein after the second operation module chooses the near-distance detection rule or the far-distance detection rule to determine whether the predetermined pattern feature is recognized in the code image, the second operation module counts the number of times when the predetermined pattern feature is recognized in the code, and the determination module accumulates the number of times;
    wherein when the barcode decoder determines that the code image is the QR code image because the number of times is equal to the threshold number, the barcode decoder is automatically turned on to capture and decode the QR code image outside the body.

5. The QR code detection device according to claim 2, wherein the barcode detector comprises:
    a buffer module, connected to the image capturing module, sequentially and temporarily storing data of each row of pixels of the code image.

6. The QR code detection device according to claim 5, wherein the image processing module further comprises a noise filter module, the noise filter module is connected between the second operation module and the determination module, and executes a noise filtering mechanism to prevent the barcode decoder from wrongly turning on.

7. The QR code detection device according to claim 6, wherein the noise filtering mechanism comprises:
    after counting the number of times when the predetermined pattern feature is recognized in the binary code image for each binary code image, resetting the number of times to zero if the number of times is larger than a threshold number;
    after counting the number of times when the predetermined pattern feature is recognized in the binary code image for each binary code image, correcting the number of times to 2 if the number of times is equal to the threshold number, or less than the threshold number but greater than 2; and
    after counting the number of times when the predetermined pattern feature is recognized in the binary code image for each binary code image, keeping the number of times if the number of times is equal to or less than 2.

8. The QR code detection device according to claim 6, wherein the noise filtering mechanism comprises:
    after counting the number of times when the predetermined pattern feature is recognized in the binary code image for each binary QR code image, correspondingly calculating a value by inputting the number of times to a noise filter function; and comparing the value with a filtering threshold, correcting the corresponding number of times to 1 if the value is greater than the filtering threshold, but resetting the corresponding number of times to zero if the value is equal to or less than the filtering threshold.

9. The QR code detection device according to claim 6, wherein the noise filtering mechanism comprises:
periodically or continually detecting the gain of the barcode detector; and
sending an interrupting signal to make the image processing module stop working if the gain of the barcode detector is greater than a threshold gain.

10. The QR code detection device according to claim 3, wherein the noise filtering mechanism comprises:
determining whether the maximum distance among the calculated distances is less than a predetermined maximum distance by the noise filter module when the second operation module determines that the predetermined pattern feature is recognized in the code image;
wherein the noise filter module sends an interrupting signal to make the image processing module stop working if the maximum distance among the calculated distances is less than the predetermined maximum distance.

11. An operation method, adapted to a QR code detection device, wherein the QR code detection device comprises a body, a barcode detector and a barcode decoder, and the barcode detector and the barcode decoder are inbuilt in the body, the operation method comprising:
capturing a code image outside the body by the barcode detector and processing the code image by the barcode detector;
accumulating a number of times when a predetermined pattern feature is recognized in the code image by the barcode detector, wherein the predetermined pattern feature is a predetermined distance ratio; and
determining that the code image is a QR code image when the number of times equals to a threshold number, and then automatically turning on the barcode decoder to capture and decode the QR code image outside the body;
wherein the barcode detector chooses a near-distance detection rule or a far-distance detection rule according to the processed QR code image to determine whether the predetermined pattern feature is recognized in the code image.

12. The operation method according to claim 11, wherein the step of capturing the code image outside the body by the barcode detector and processing the code image by the barcode detector comprises:
capturing the code image outside the body;
receiving and sequentially detecting edges of the code image to generate a gray-scale code image;
receiving and processing the gray-scale code image to generate a binary code image, by converting the gray-scale levels of pixels that are larger than a critical gray-scale level to be a maximum gray-scale level and defining the gray-scale levels of pixels that are smaller than the critical gray-scale level to be a minimum gray-scale level.

13. The operation method according to claim 12, further comprising:
receiving the binary barcode image, generating a fever chart according to the pixel coordinate and the gray-scale level of a row/column of pixels in the binary code image, and calculating distances between the pixels having the maximum gray-scale level to determine whether the minimum distance among the calculated distances is shorter than a predetermined minimum distance and to generate a determination result, and accordingly calculating a number of times when the predetermined pattern feature is recognized in the code image;
wherein the near-distance detection rule is chosen to determine whether the predetermined pattern feature is recognized in the code image if the determination result indicates that the minimum distance among the calculated distances is longer than or equal to the predetermined minimum distance, but the far-distance detection rule is chosen to determine whether the predetermined pattern feature is recognized in the code image if the determination result indicates that the minimum distance among the calculated distances is shorter than the predetermined minimum distance.

14. The operation method according to claim 12, wherein after the step of capturing the code image outside the body, the operation method further comprises:
sequentially and temporarily store data of each row of pixels of the code image.

15. The operation method according to claim 14, wherein the step of capturing the code image outside the body by the barcode detector and processing the code image further comprises:
executing a noise filtering mechanism to prevent the barcode decoder from wrongly turning on.

16. The operation method according to claim 15, wherein the noise filtering mechanism comprises:
after counting the number of times when the predetermined pattern feature is recognized in the binary code image for each binary code image, resetting the number of times to zero if the number of times is larger than a threshold number;
after counting the number of times when the predetermined pattern feature is recognized in the binary code image for each binary code image, correcting the number of times to 2 if the number of times is equal to the threshold number, or less than the threshold number but greater than 2; and
after counting the number of times when the predetermined pattern feature is recognized in the binary code image for each binary code image, keeping the number if the number of times is equal to or less than 2.

17. The operation method according to claim 15, wherein the noise filtering mechanism comprises:
after counting the number of times when the predetermined pattern feature is recognized in the binary code image for each binary QR code image, and correspondingly calculating a value by inputting the number of times to a noise filter function; and
comparing the value with a filtering threshold, correcting the corresponding number of times to 1 if the value is greater than the filtering threshold, but resetting the corresponding number of times to zero if the value is equal to or less than the filtering threshold.

18. The operation method according to claim 15, wherein the noise filtering mechanism comprises:
periodically or continually detecting the gain of the barcode detector; and
sending an interrupting signal to make the barcode detector stop working if the gain of the barcode detector is greater than a threshold gain.

19. The operation method according to claim 15, wherein the noise filtering mechanism comprises:
- determining whether the maximum distance among the calculated distances is less than a predetermined maximum distance when the barcode detector determines that the predetermined pattern feature is recognized in the code image;
- wherein an interrupting signal is sent to make the barcode detector stop working if the maximum distance among the calculated distances is less than the predetermined maximum distance.

* * * * *